(12) United States Patent
Xu et al.

(10) Patent No.: US 8,010,588 B2
(45) Date of Patent: Aug. 30, 2011

(54) OPTIMIZED MULTI-MODE DFT IMPLEMENTATION

(75) Inventors: Yuhuan Xu, Espoo (FI); Ludwig Schwoerer, Hattingen (DE)

(73) Assignee: Nokia Corporation, Espoo (FI)

( * ) Notice: Subject to any disclaimer, the term of this patent is extended or adjusted under 35 U.S.C. 154(b) by 1098 days.

(21) Appl. No.: 11/819,510

(22) Filed: Jun. 27, 2007

(65) Prior Publication Data

US 2008/0126462 A1    May 29, 2008

(30) Foreign Application Priority Data

Jun. 27, 2006  (EP) ..................................... 06013260
Mar. 16, 2007  (EP) ..................................... 07005475

(51) Int. Cl.
*G06F 17/14*    (2006.01)
(52) U.S. Cl. ...................................... 708/405
(58) Field of Classification Search .................... None
See application file for complete search history.

(56) References Cited

U.S. PATENT DOCUMENTS

| | | | | |
|---|---|---|---|---|
| 3,971,922 A | * | 7/1976 | Bellanger et al. | 708/316 |
| 5,253,192 A | * | 10/1993 | Tufts | 708/403 |
| 2010/0306298 A1 | * | 12/2010 | Cenciotti et al. | 708/402 |

OTHER PUBLICATIONS

Erling H. Wold, et al.; "Pipeline and Parallel-Pipeline FFT Processors for VLSI Implementations"; May 1984; pp. 414-426. XP 000671267.

S. Winograd, et al.; "On Computing the Discrete Fourier Transform"; Nov. 1976; pp. 1-25. XP 013119542.

Richard C. Singleton; "An Algorithm for Computing the Mixed Radix Fast Fourier Transform"; Dec. 1968; pp. 93-103. XP 002509044.

Rami Al Na'Mneh, et al.; "Five-step FFT Algorithm with Reduced Computational Complexity"; Oct. 2006; pp. 262-267. XP 005831232.

Andreas Ibing, et al.; "On Hardware Implementation of Multiuser Multiplexing for SC-FDMA"; Jun. 2007; pp. 2056-2059 XP 031147770.

* cited by examiner

*Primary Examiner* — David H Malzahn
(74) *Attorney, Agent, or Firm* — Squire, Sanders & Dempsey (US) LLP

(57) ABSTRACT

The present invention relates to a method and apparatus for implementing a discrete Fourier transformation (DFT) of a predetermined vector size, wherein at least one enhanced DFT module is provided by using at least one type of DFT module including multiplication by first and second types of twiddle factors in respective different multiplication stages separated by an intermediate integration stage, and generating the enhanced DFT module by combining the at least one type of DFT module with a recursive stage configured to multiply by a third type of twiddle factor and to selectively switch between a bypass function and a butterfly function in said recursive stage. Thereby, an implementation of non $2^x$-radix Fourier transformation can be achieved with moderate hardware complexity.

22 Claims, 8 Drawing Sheets

OPTIMIZED MULTI-MODE DFT IMPLEMENTATION

FIELD OF THE INVENTION

The present invention relates to a method and apparatus for implementing a discrete Fourier transformation (DFT) of a predetermined vector size.

BACKGROUND OF THE INVENTION

Many current communication systems are based on Orthogonal Frequency Division Multiplexing (OFDM) and related technologies. The Fourier transformation of a signal from time domain into frequency domain and vice versa is one of the most important processing modules in such systems. The fast Fourier transform (FFT) is an efficient algorithm to compute a DFT and its inverse. In general, FFTs are of great importance to a wide variety of other applications as well, e.g., digital signal processing for solving partial differential equations, algorithms for quickly multiplying large integers, and the like.

A limitation of FFT is that it can only process data vectors which have a length in the form of $2^x$, where x is a positive integer. However, latest communication standards, e.g. EUTRAN/LTE (Enhanced Universal Mobile Telecommunications System Terrestrial Radio Access Network/Long Term Evolution) use Fourier transformation of signals with a vector length other than $2^x$, which requires DFT. Compared with FFT, a straight forward implementation of the DFT algorithm would result in unacceptable processing time of the order $n^2$.

The U.S. Pat. No. 5,233,551 discloses a radix-12 DFT/FFT building block using classic FFT rules, which first divides the input values into six groups of two values for the first tier which contains six multiplier-free radix-2 DFT processing elements. The output of the first tier (12 complex values) is then divided into two groups of six values and used as input for the second tier which contains two multiplier-free radix-6 DFT processing element. As a consequence, complex twiddle factor multipliers and ancillary address reduce to a total of 144 real adds required to perform the entire complex 12-point FFT.

SUMMARY OF THE INVENTION

It is therefore an object of the present invention to provide a fast DFT implementation for transforming signals with vector lengths other than $2^x$ and moderate hardware complexity.

This object is achieved by a method comprising:
  implementing a discrete Fourier transformation DFT by using at least one enhanced DFT module;
  using at least one type of DFT module including multiplication by first and second types of twiddle factors in respective different multiplication stages separated by an intermediate integration stage;
  generating said enhanced DFT module by combining said at least one type of DFT module with a recursive stage configured to multiply by a third type of twiddle factor; and
  selectively switching between a bypass function and a butterfly function in said recursive stage.

Furthermore, the above object is achieved by an apparatus comprising:
  a processing unit for performing a discrete Fourier transformation DFT, said processing unit having at least one enhanced DFT module;
  wherein said enhanced DFT module comprises:
    at least one type of DFT module having multiplication stages for multiplying by respective first and second types of twiddle factors, said multiplication stages being separated by intermediate integration stages; and
    a recursive stage configured to multiply by a third type of twiddle factor, said recursive stage being configured to selectively provide a bypass function or a butterfly function.

Accordingly, an implementation of non $2^x$-radix Fourier transformation can be achieved with moderate hardware complexity and with a wide range of vector lengths optimized for individual hardware implementations. Additionally, the order of operation number (especially the number of multiplications) and thus the reduced processing time can be reduced.

In an embodiment, at least two different types of the at least one type of DFT module can be combined to obtain another enhanced DFT module. Then, the at least one of the enhanced DFT module and the other enhanced DFT module could be combined to obtain a DFT with a desired vector size. Thereby, a desired vector size with a value other than $2^x$ (x being an integer number) can be achieved.

According to a specific implementation example, the enhanced DFT module may have a vector size of 12 samples and the other enhanced DFT module has a vector size of 24 samples. In this case, desired vector sizes can be selected from the values of 1152, 576, 288, 144, 48, and 24.

The bypass function of the recursive stage may be selected if a desired vector size of the DFT is smaller than the vector size of the enhanced DFT module.

As another option, a may be multiplication stage may be replaced by adding twiddle factors of different processing stages.

Further advantageous modifications are described in the dependent claims.

BRIEF DESCRIPTION OF THE DRAWINGS

The present invention will now be described in greater detail based on embodiments with reference to the accompanying drawings, in which.

DESCRIPTION OF THE EMBODIMENTS

In the following, the embodiments of the present invention will be described in connection with DFT implementations based on the Cooley-Tukey algorithm.

The Cooley-Tukey algorithm is disclosed in James W. Cooley and John W. Tukey, "An algorithm for the machine calculation of complex Fourier series," Math. Comput. 19, 297-301 (1965). This is a divide and conquer algorithm that recursively breaks down a DFT of any composite size $N=N_1 N_2$ into many smaller DFTs of sizes $N_1$ and $N_2$, along with O(n) multiplications by complex roots of unity traditionally called twiddle factors. If $N_1$ is the radix, it is called a decimation in time (DIT) algorithm, whereas if $N_2$ is the radix, it is called a decimation in frequency (DIF, also called the Sande-Tukey algorithm).

One example of use of the Cooley-Tukey algorithm is to divide the transform into two pieces of size n/2 at each step, and is therefore limited to power-of-two sizes, but any factorization can be used in general. These are called the radix-2 and mixed-radix cases, respectively (and other variants have their own names as well). Although the basic idea is recursive, most traditional implementations rearrange the algorithm to avoid explicit recursion. Also, because the Cooley-Tukey algorithm breaks the DFT into smaller DFTs, it can be combined arbitrarily with any other algorithm for the DFT.

According to the following embodiments, DFT modules and devices are implemented based on the Cooley-Tukey algorithm for a wide range of vector lengths, e.g., 1200, 600, 300, 150, 75, 50 and 25. Here, basic module for all modes can be the DFT-25, while other modules are then built based on the DFT-25, and output values are re-ordered.

As another example described later, implementation of further vector lengths DFT-1152, 576, 288, 144, 48 and 24 can be obtained based on DFT-12 and DFT-72 modules.

Furthermore, the implementation is optimized for hardware realization due to a reduced number of multiplications, which results in processing time of the order n*log(n).

The embodiments are implemented as DIF, although an implementation as Decimation in Time (DIT) would of course be possible as well.

Figure 1:
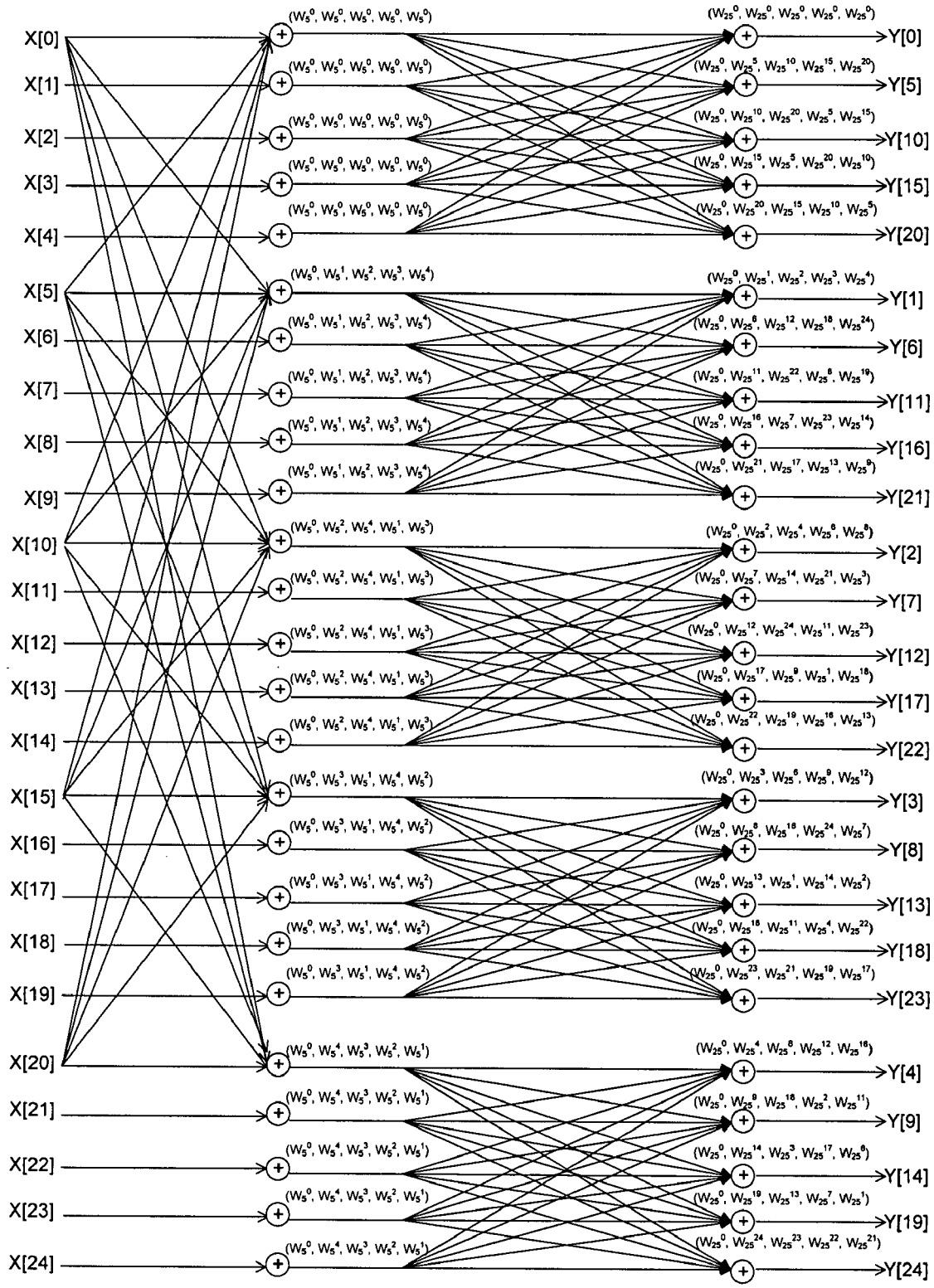
FIG. 1 shows a schematic data flow graph of a basic DFT-25 module.

FIG. 1 shows a schematic data flow graph of the basic DFT-25 module based on the Cooley-Tukey algorithm. It is noted that not all transitions are shown with arrows for reasons of better readability and clarity. The DFT algorithm can be described as follows:

$$y[k] = \sum_{n=0}^{4} W_{25}^{nk} \{x[n] + x[n+5]W_5^k + x[n+10]W_5^{2k} + x[n+15]W_5^{3k} + x[n+20]W_5^{4k}\},$$

with k=0 ... 24, and can be further transformed to:

$$y[5i] = \sum_{n=0}^{4} W_{25}^{n(5i)} \{x[n] + x[n+5] + x[n+10] + x[n+15] + x[n+20]\},$$

$$y[5i+1] = \sum_{n=0}^{4} W_{25}^{n(5i+1)} \{x[n] + x[n+5]W_5^1 + x[n+10]W_5^2 + x[n+15]W_5^3 + x[n+20]W_5^4\},$$

$$y[5i+2] = \sum_{n=0}^{4} W_{25}^{n(5i+2)} \{x[n] + x[n+5]W_5^2 + x[n+10]W_5^4 + x[n+15]W_5^1 + x[n+20]W_5^3\},$$

$$y[5i+3] = \sum_{n=0}^{4} W_{25}^{n(5i+3)} \{x[n] + x[n+5]W_5^3 + x[n+10]W_5^1 + x[n+15]W_5^4 + x[n+20]W_5^2\},$$

$$y[5i+4] = \sum_{n=0}^{4} W_{25}^{n(5i+4)} \{x[n] + x[n+5]W_5^4 + x[n+10]W_5^3 + x[n+15]W_5^2 + x[n+20]W_5^1\},$$

The 25 input values X[0] to X[24] are in natural order (DIF) and divided into 5 groups with 5 values each. The twiddle factors $W_x^y$ to be multiplied at the input and at the output according to the above transformed equations are grouped into five groups with five twiddle factors in each group. These are given in brackets beside the "+" symbol of the data flow graph, and can be calculated as follows:

$$W_x^y = e^{j*y*2\pi/x}.$$

The first twiddle factor in each bracket corresponds to the first transition which leads to the "+" symbol, the second twiddle factor corresponds to the second transition, and so on. The results Y[0] to Y[24] of the DFT-25 data processing are not reordered immediately. The reordering will be made after all values of the DFT are calculated.

Figure 2:
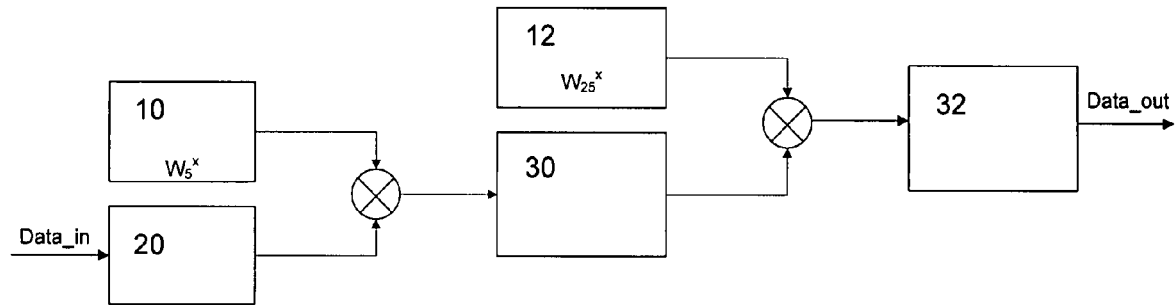
FIG. 2 shows a schematic block diagram of an implementation of the basic DFT-25 module.

FIG. 2 shows a schematic block diagram of an implementation of the basic DFT-25 module according to the first embodiment.

Input data (X[i]) is supplied to a 5× or 5-times hold unit 20 and the stored samples are supplied to a first multiplier and multiplied with an assigned twiddle factor $W_5^x$ generated in a first twiddle factor generating unit 10. Five successive outputs of the first multiplier are added in a first integrator unit 30 and then supplied to a second multiplier where the obtained sum is multiplied with another assigned twiddle factor W25x generated in a second twiddle factor generating unit 12. Again, five successive outputs of the second multiplier are added in a second integrator unit 32 to obtain the output data (Y[i]).

Figure 3:
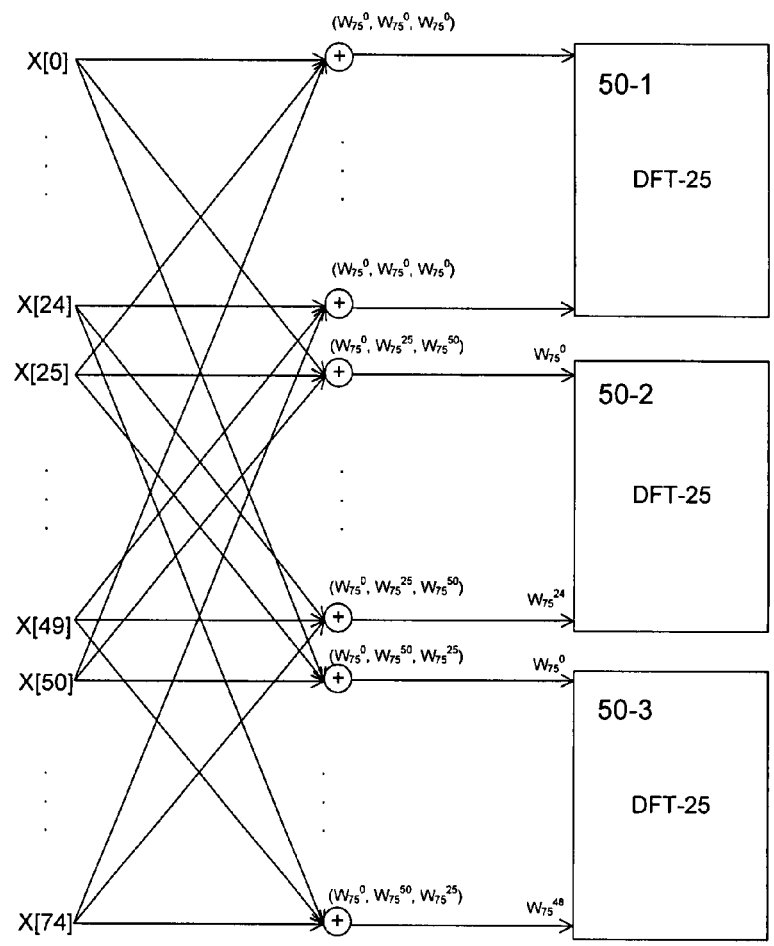
FIG. 3 shows a schematic data flow graph of a derived DFT-75 module.

FIG. 3 shows a schematic data flow graph of a DFT-75 module according to the first embodiment based on the Cooley-Tukey algorithm and derived from three basic DFT-25 modules 50-1 to 50-3. It is again noted that not all transitions are shown with arrows for reasons of better readability and clarity.

The algorithm can be described as follows:

$$y[k] = \sum_{n=0}^{24} W_{75}^{nk} \{x[n] + x[n+25]W_{75}^{25k} + x[n+50]W_{75}^{50k}\},$$

with k=0 ... 74, and can be further transformed to:

$$y[3i] = \sum_{n=0}^{24} W_{25}^{ni}\{x[n] + x[n+25] + x[n+50]\},$$

$$y[3i+1] = \sum_{n=0}^{24} W_{25}^{ni} W_{75}^{n}\{x[n] + x[n+25]W_{75}^{25} + x[n+50]W_{75}^{50}\},$$

$$y[3i+2] = \sum_{n=0}^{24} W_{25}^{ni} W_{75}^{2n}\{x[n] + x[n+25]W_{75}^{50} + x[n+50]W_{75}^{25}\},$$

with $i = 0 \ldots 24$.

The output values are not reordered.

Figure 4:
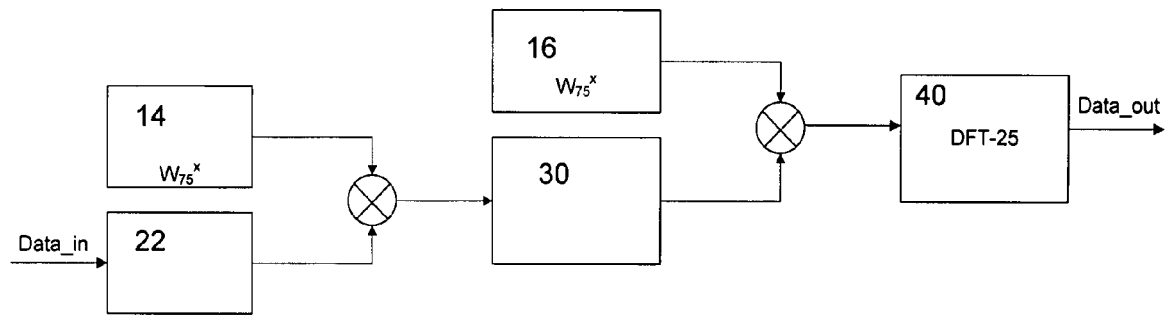
FIG. 4 shows a schematic block diagram of an implementation of the derived DFT-75 module according to an embodiment.

FIG. 4 shows a schematic block diagram of an implementation of the DFT-75 modules 50-1 to 50-3 according to the first embodiment.

Input data (X[i]) is now supplied to a 3× or 3-times hold unit 22 and the stored samples are supplied to a first multiplier and multiplied with an assigned twiddle factor $W_{75}^{x}$ generated in a first twiddle factor generating unit 14. Three successive outputs of the first multiplier are added in a first integrator unit 30 and then supplied to a second multiplier where the obtained sum is supplied to a basic DFT-25 module 40 (e.g. as shown in FIG. 2) to obtain the output data (Y[i]).

Figure 5:
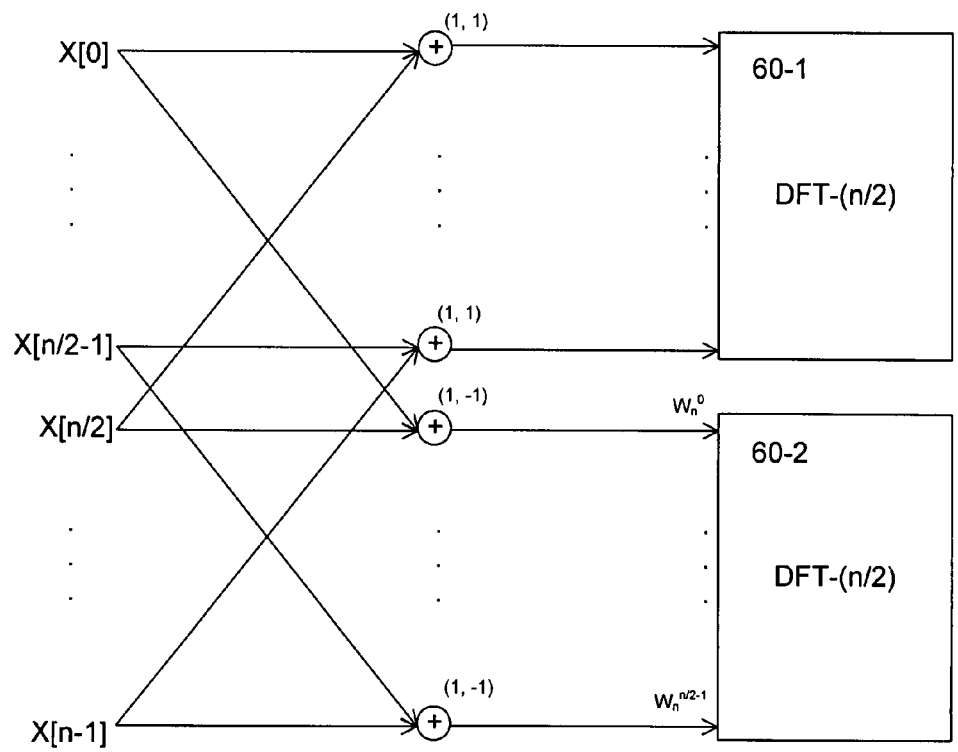
FIG. 5 shows a basic data flow graph of derived DFT-1200, 600, 300, 150, and 50 modules.

FIG. 5 shows a basic data flow graph of derived DFT-1200, 600, 300, 150, and 50 modules based on a method of dividing a Radix-n DFT into two Radix-n/2 DFT blocks 60-1 and 60-2. With recursive utilization of this structure, various DFT vector sizes can be generated, such as DFT-1200, 600, 300, 150 and 50 modules obtained based on DFT-75 and DFT-25 modules, or DFT-1152, 576, 288, 144, 48 and 24 modules obtained based on the DFT-12 and DFT-72 modules.

Thus, the implementation of the DFT-1200, 600, 300, 150, and 50 modules can be based on the basic DFT-25 module and the derived DFT-75 module, and the implementation of the DFT-1152, 576, 288, 144, 48 and 24 modules obtained based on the basic DFT-12 and DFT-72 modules.

Figure 6:
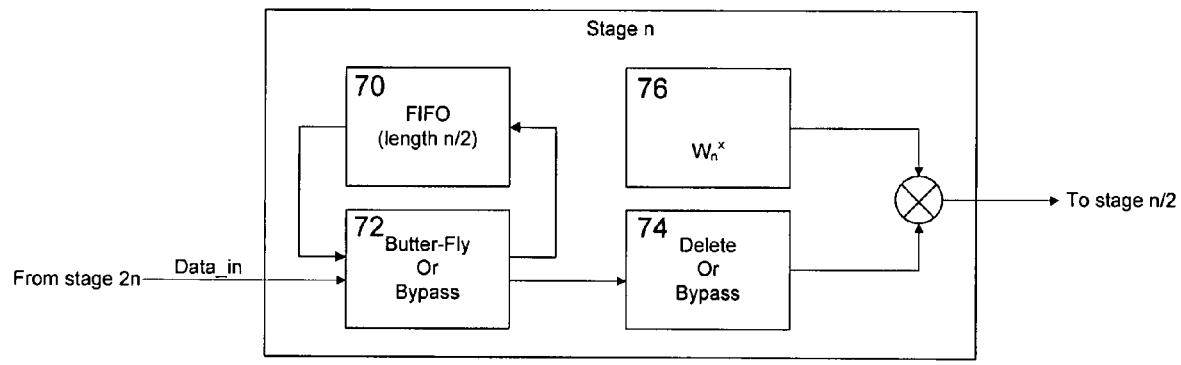
FIG. 6 shows a schematic block diagram of an implementation of a recursive stage of length n according to an embodiment.

FIG. 6 shows a schematic block diagram of an implementation of a recursive stage of length n according to an embodiment. If the DFT-length is less than the stage length n, the stage is simply bypassed through a selective butterfly or bypass unit 72, where the two input lines are selectively either connected directly to the output lines or crossed (butter-fly connection) so that the upper input line is connected to the lower output line and vice versa, and through a subsequent delete or bypass unit 74, where the samples are selectively either deleted or by-passed. If the DFT-length is equal or greater than the stage length n, the first n/2 incoming samples are stored in a FIFO (First-In-First-Out) memory 70 (e.g. a shift register). Together with the next n/2 incoming samples, the butter-fly operation of the butter-fly or bypass unit 72 is performed on these n samples. After multiplication at a subsequent multiplier with twiddle factors $W_n^{x}$ generated at a twiddle factor generating unit 76, the samples are output to the next stage of length n/2.

Thus, a modular and flexible DFT implementation for vector lengths other than $2^x$ can be obtained.

However, the above DFT implementations based on the Cooley-Tukey algorithm generally have a butter-fly structure except the last stage of operation (basic DFT module). An example of a DFT of length n was shown in FIG. 5. In such an implementation, the major part of the processing power is consumed for multiplications. Hence reduction of necessary multiplications leads to substantial improvement in performance and hardware cost.

Figure 7:
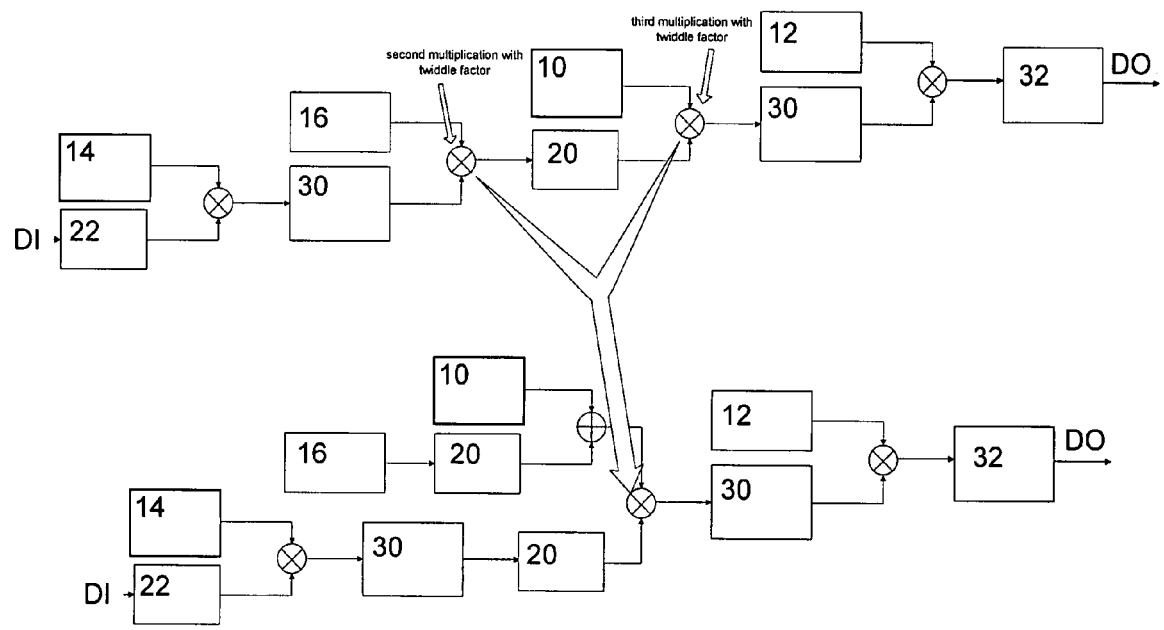
FIG. 7 shows a schematic block diagram of an implementation of a derived DFT-75 module according to an embodiment.

FIG. 7 shows a schematic block diagram of an implementation of a derived DFT-75 module according to another embodiment.

According to this other embodiment, multiplications are combined with the twiddle factors in the last two stages of a DFT implementation. In case of the DFT-75 module, the number of multiplications can be reduced by 7%. The proposed solution can be used for all DFT implementations based on Cooley-Tukey algorithm.

In the upper part of FIG. 7, the above DFT-75 module according to the second embodiment is shown as a combination of the block diagrams of FIGS. 2 and 4. It can be gathered that between the second and the third multiplication with the twiddle factors of the twiddle factor generating units 16 and 10, no other arithmetical operations are performed. The two multiplications with the twiddle factors can be combined into one addition and one multiplication:

$$a \cdot W_{x1}^{y1} \cdot W_{x2}^{y2} = a \cdot e^{jy_1 \cdot 2\pi/x_1} \cdot e^{jy_2 \cdot 2\pi/x_2} = a \cdot e^{j(y_1/x_1 + y_2/x_2) \cdot 2\pi}$$

As an example, the lower part of FIG. 2 shows an optimized block diagram of the DFT-75 implementation according to this embodiment with reduced number of multiplications. This implementation can be generalized for any other DFT implementation of length L, where L can be further factorized as:

$$L = a \cdot b \cdot c,$$

where a, b and c are positive integers. In case of the DFT-75 module, the factor "a" is 3, while "b" and "c" are 5.

Figure 8:
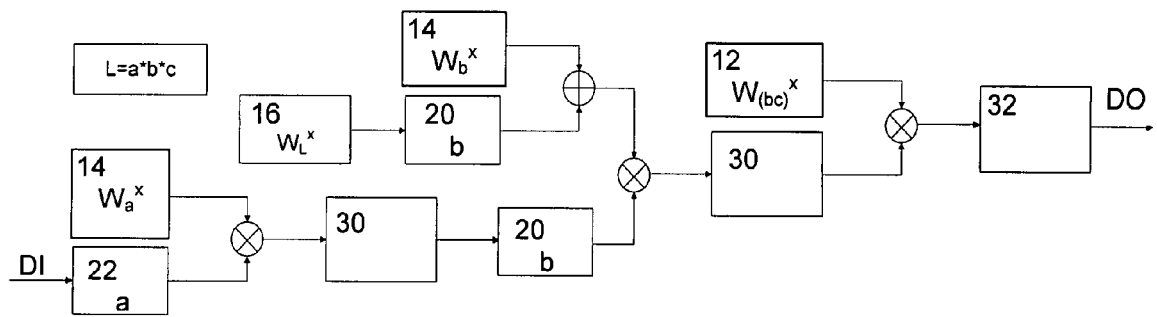
FIG. 8 shows a schematic block diagram of a generalized DFT implementation according to an embodiment.

FIG. 8 shows a schematic block diagram of a generalized DFT implementation according to this embodiment with length L, similar to FIG. 7, where the twiddle factors $W_L^{x}$ and $W_b^{x}$ are added to save one multiplication operation.

In the following embodiments, a DFT is implemented based on the Cooley-Tukey algorithm for a wide range of vector lengths optimized for hardware implementation of exemplary DFT-1152, DFT-576, DFT-288, DFT-144, DFT-72, DFT-48, DFT-24 and DFT-12 modules or stages.

Again, all modes are implemented as Decimation in Frequency (DIF), although an implementation as Decimation in Time (DIT) is also possible as well. Here, the basic module for all modes is the DFT-12 module. This module is now described first, before implementation of other modes based on the DFT-12 are described.

As already mentioned, the DFT-12 implementation is based on the Cooley-Tukey algorithm.

Figure 9:
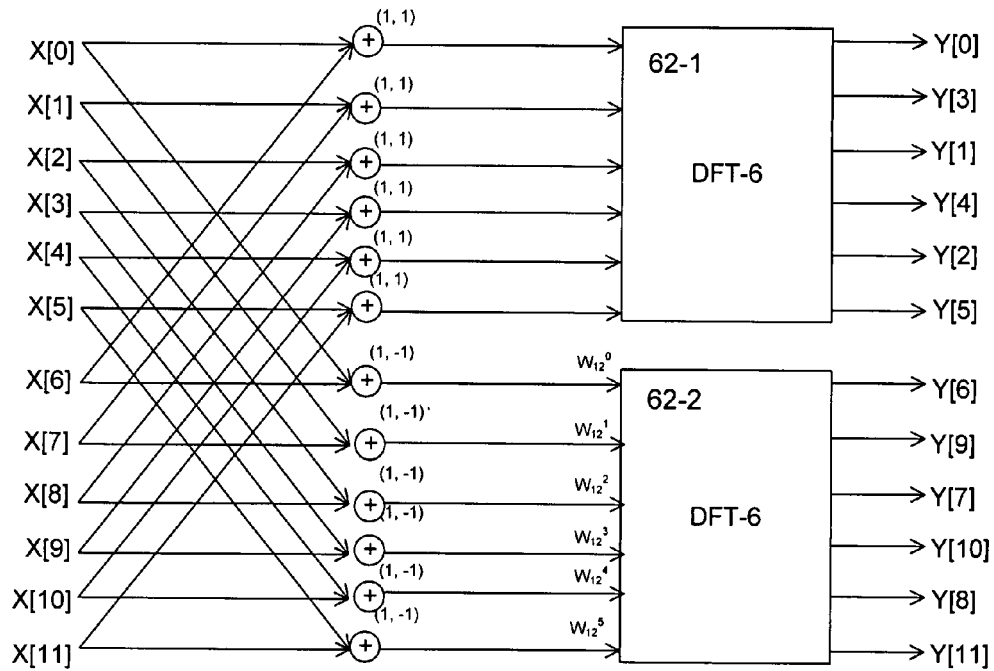
FIG. 9 shows a schematic data flow graph of a derived DFT-12 module according to an embodiment.

FIG. 9 shows a schematic data flow graph of the derived DFT-12 module according to an embodiment.

The 12 input values X[0] to X[11] are in natural order (DIF) and divided into 2 groups with 6 values each supplied to basic DFT-6 modules 62-1 and 62-2. The twiddle factors are given by:

$$W_x^{y} = e^{j*y*2\pi/x}.$$

Figure 10:
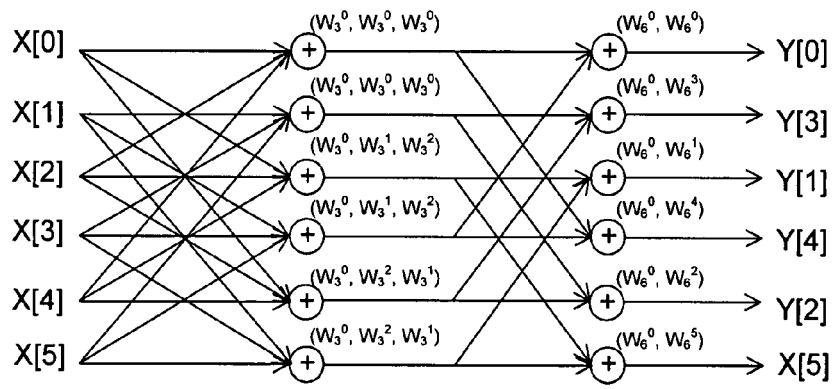
FIG. 10 shows a schematic data flow graph of a basic DFT-6 module.

FIG. 10 shows a schematic data flow graph of each of the basic DFT-6 modules 62-1 and 62-2 used in FIG. 9.

The first twiddle factor in the bracket is associated with the first transition which leads to the "+" symbol, the second twiddle factor is associated with the second transition and so on. The results of the DFT-12 are not reordered immediately. The reordering can be made after all the values of the DFT have been calculated.

Figure 11:
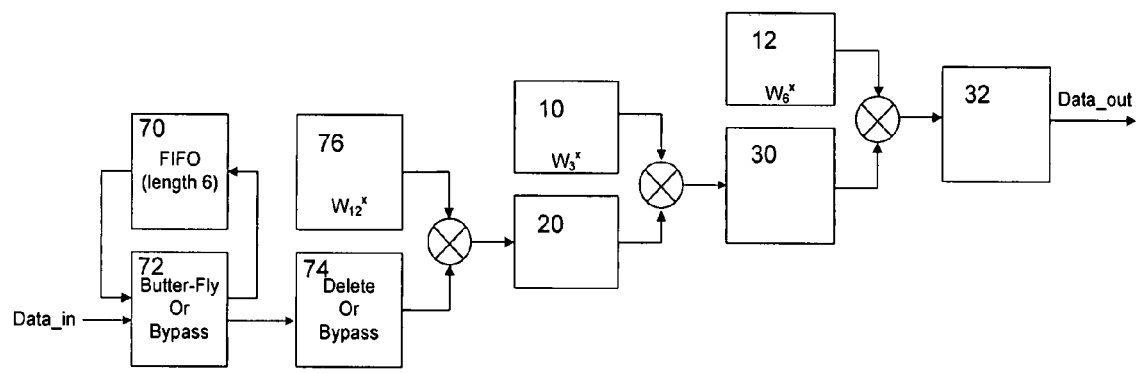
FIG. 11 shows a schematic block diagram of an implementation of the derived DFT-12 module according to an embodiment.

FIG. 11 shows a schematic block diagram of an implementation of the derived DFT-12 module according to this embodiment. Basically, this implementation corresponds to a combination of the recursive stage described in connection with FIG. 6 and basic DFT-6 module similar to the DFT-25 module of FIG. 2, wherein a 3× hold stage 20 (instead of a 5× hold stage) and twiddle factors $W^3_x$ and $W^6_x$ (instead of twiddle factors $W^5_x$ and $W^{25}_x$) are now generated in stages 10 and 12, respectively. The recursive stage of FIG. 6 is implemented with a FIFO length of 6 samples and twiddle factors $W^{12}_x$.

In the following, an implementation of a DFT-72 module is described based on the Cooley-Tukey algorithm. The corresponding algorithm can be described as:

$$y[k] = \sum_{n=0}^{23} W_{72}^{nk}\{x[n] + x[n+24]W_{72}^{24k} + x[n+48]W_{72}^{48k}\},$$

with k=0 . . . 71 and can be further transformed to $$y[3i] = \sum_{n=0}^{23} W_{24}^{ni}\{x[n] + x[n+24] + x[n+48]\},$$

$$y[3i+1] = \sum_{n=0}^{23} W_{24}^{ni}W_{72}^{n}\{x[n] + x[n+24]W_{72}^{24} + x[n+48]W_{72}^{48}\},$$

with $i = 0 \ldots 23$.

$$y[3i+2] = \sum_{n=0}^{23} W_{24}^{ni}W_{72}^{2n}\{x[n] + x[n+24]W_{72}^{48} + x[n+48]W_{72}^{24}\}.$$

Figure 12:
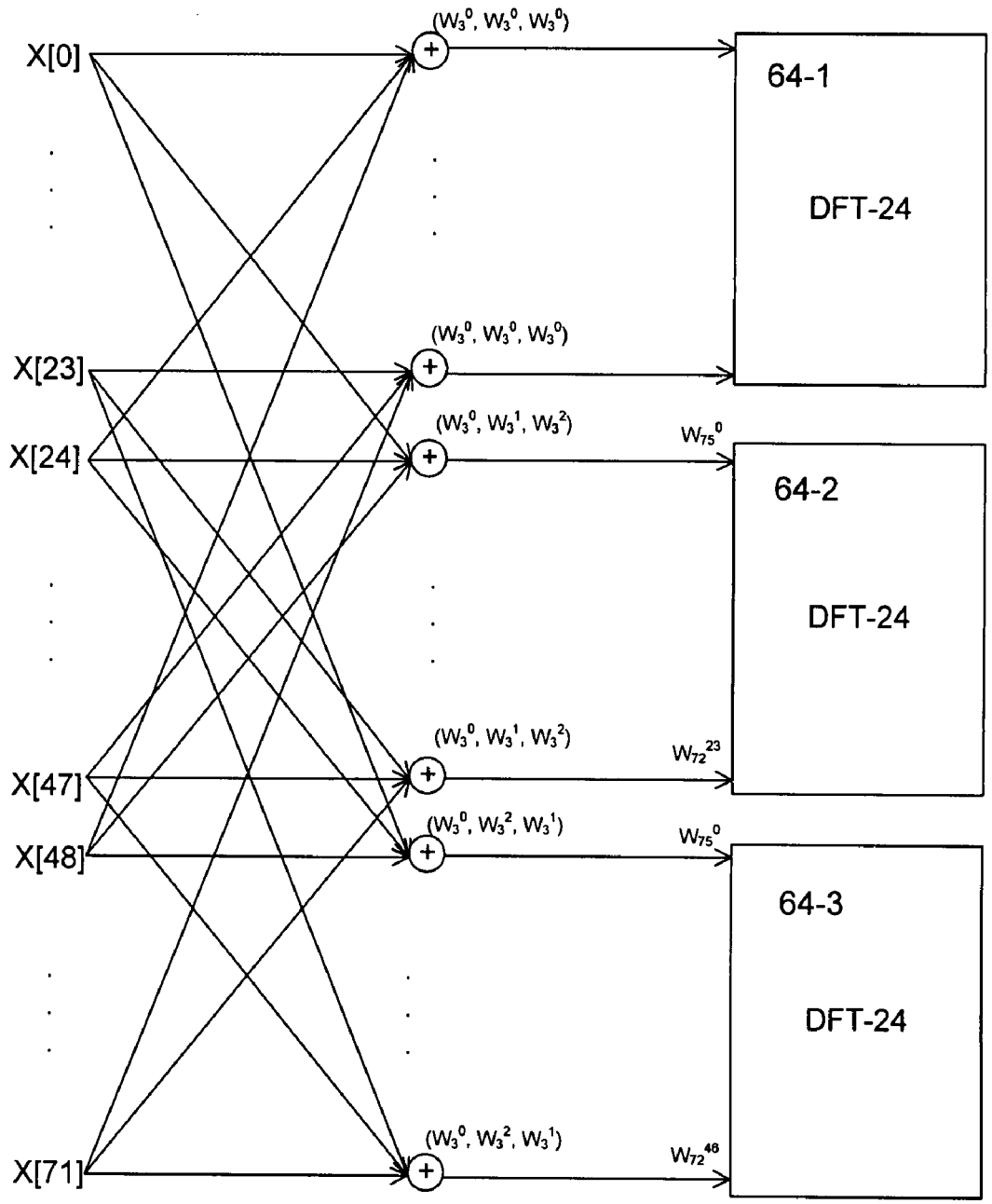
FIG. 12 shows a schematic data flow graph of a derived DFT-72 module according to an embodiment.

FIG. 12 shows a schematic data flow graph of this derived DFT-72 module according to an embodiment. This data flow graph basically corresponds to the DFT-75 graph shown in FIG. 3, where the DFT-25 modules are now replaced by DFT-24 modules.

Figure 13:
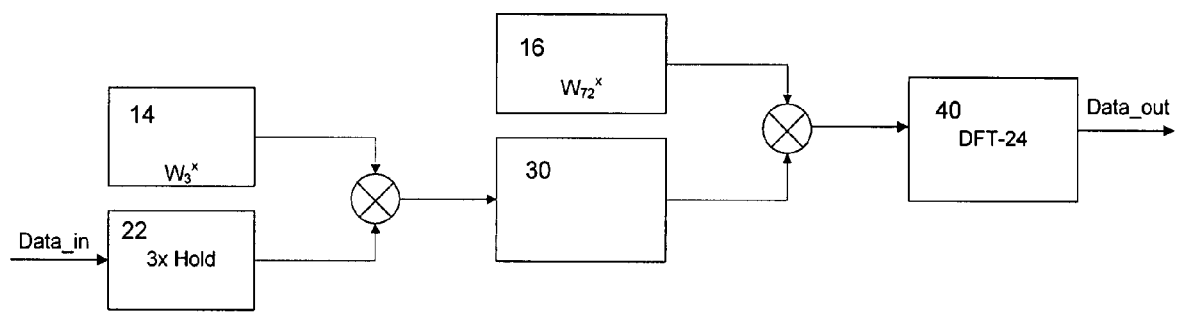
FIG. 13 shows a schematic block diagram of an implementation of the derived DFT-72 module according to an embodiment.

FIG. 13 shows a schematic block diagram of an implementation of the derived DFT-72 module according to an embodiment. The output values are not reordered. This implementation basically corresponds to the implementation of the DFT-75 module of FIG. 4 with the differences that a DFT-24 module 40 is now used and twiddle factors $W_3^x$ and $W_{72}^x$ (instead of twiddle factors $W_{75}^x$) are now generated in stages 14 and 16, respectively.

Implementation of DFT-1152, DFT-576, DFT-288, DFT-144, DFT-48 and DFT-24 can now be based on the above DFT-12 and DFT-72 modules. Already mentioned above, FIG. 5 shows the basic data flow graph on which the DFT-1152, 576, 288, 144, 48 and 24 modules can be based. With recursive utilization of this structure, DFT-1152, 576, 288, 144, 48 and 24 can be generated based on DFT-72 and DFT-12. A recursive stage of length n is shown in FIG. 6. If the DFT-length is less than the stage length n, the stage is simply bypassed. If the DFT-length is equal or greater than the stage length n, the first n/2 incoming samples are stored in the FIFO. Together with the next n/2 incoming samples, the butter-fly operation is performed on these n samples. After the multiplication with the twiddle factors, the samples are given to the next stage of length n/2.

According to the embodiments described above, implementation of non $2^x$-radix Fourier Transform with moderate hardware complexity possible and the complex implementation described in the initially mentioned U.S. Pat. No. 5,233,551 can be prevented.

Furthermore, as regards the above embodiments, it is noted and apparent to the skilled person that the functionalities of the individual blocks shown in FIGS. 2, 4, 6, 7, 8, 11, and 13 can be implemented as discrete hardware circuits or alternatively as software programs to be downloaded from a network or stored on a computer-readable medium and controlling a processor or computer device to generate the desired functions when run thereon.

In summary, a method and apparatus for implementing a DFT of a predetermined vector size have been described, wherein at least one enhanced DFT module is provided by using at least one type of DFT module including multiplication by first and second types of twiddle factors in respective different multiplication stages separated by an intermediate integration stage, and generating the enhanced DFT module by combining the at least one type of DFT module with a recursive stage configured to multiply by a third type of twiddle factor and to selectively switch between a bypass function and a butterfly function in said recursive stage. Thereby, an implementation of non $2^x$-radix Fourier transformation can be achieved with moderate hardware complexity.

The preferred embodiments can be used in any DFT processing environment, for example in wireless access networks, such as UTRAN or EUTRAN, or alternatively in any other signal processing environment. The DFT modules are not restricted to the above mentioned DFT-12, DFT-24, DFT-25 and/or DFT-75 modules. Rather, any suitable module size can be implemented. The preferred embodiments my thus vary within the scope of the attached claims.

The invention claimed is:

1. A method comprising:
   using a discrete Fourier transformation DFT module to execute a multiplication of first and second twiddle factors in respective different multiplication stages separated by an intermediate integration stage and generating an output indicative thereof;
   generating an enhanced DFT module by multiplying the output of the DFT module and an output of a recursive stage with a third twiddle factor;
   selectively switching between a bypass function and a butterfly function in said recursive stage; and
   implementing a DFT by using said enhanced DFT module.

2. The method according to claim 1, further comprising:
   combining two different DFT modules to obtain another enhanced DFT module.

3. The method according to claim 2, further comprising:
   using at least one of said enhanced DFT module and said other enhanced DFT module to obtain a DFT with a desired vector size.

4. The method according to claim 3, wherein said enhanced DFT module has a vector size of 12 samples and said other enhanced DFT module has a vector size of 24 samples.

5. The method according to claim 3, wherein said desired vector size is a value other than $2^x$, x being an integer number.

6. The method according to claim 5, wherein said desired vector size is selected from the values of 1152, 576, 288, 144, 48, and 24.

7. The method according to claim 1, further comprising:
   selecting said bypass function of said recursive stage if a desired vector size of said DFT is smaller than a vector size of said enhanced DFT module.

8. The method according to claim 1, further comprising:
   replacing a multiplication stage by adding twiddle factors of different processing stages.

9. A computer program embodied on a computer readable medium, the computer program being configured to control a processor to perform:

using a discrete Fourier transformation (DFT) module to execute a multiplication of first and second twiddle factors in respective different multiplication stages separated by an intermediate integration stage;

generating an enhanced DFT module by combining said DFT module with a recursive stage and multiplying a third twiddle factor and generating an output indicative thereof; and generating an enhanced DFT module by multiplying the output of the DFT module and an output of a recursive stage with a third twiddle factor selectively switching between a bypass function and a butterfly function in said recursive stage; and implementing a DFT by using said enhanced DFT module.

10. An apparatus, comprising:
a processing unit configured to perform a discrete Fourier transformation (DFT), said processing unit having at least one enhanced DFT module, wherein said enhanced DFT module comprises at least one type of DFT module comprising multiplication stages to multiply respective first and second twiddle factors, said multiplication stages being separated by intermediate integration stages; and a recursive stage coupled to said at least one type of DFT module configured to multiply by a third type of twiddle factor, and selectively provide a bypass function or a butterfly function.

11. The apparatus according to claim 10, wherein said processing unit comprises another enhanced DFT module configured as a combination of two different types of said at least one type of DFT module.

12. The apparatus according to claim 11, wherein said processing unit comprises at least one of said enhanced DFT module and said other enhanced DFT module to obtain a DFT with a desired vector size.

13. The apparatus according to claim 12, wherein said enhanced DFT module has a vector size of 12 samples and said other enhanced DFT module has a vector size of 24 samples.

14. The apparatus according to claim 12, wherein said desired vector size is a value other than $2^x$, x being an integer number.

15. The apparatus according to claim 14, wherein said desired vector size is selected from the values of 1152, 576, 288, 144, 48, and 24.

16. The apparatus according to claim 10, wherein said recursive stage is controlled to select said bypass function of said recursive stage if a desired vector size of said DFT is smaller than the vector size of said enhanced DFT module.

17. An apparatus, comprising:
processing means for performing a discrete Fourier transformation (DFT), said processing means having at least one enhanced DFT module, wherein said enhanced DFT module comprises at least one type of DFT module having multiplication stages for multiplying by respective first and second twiddle factors, said multiplication stages being separated by intermediate integration stages; and recursive stage means coupled to said at least one type of DFT module for multiplying by a third type of twiddle factor, and for selectively providing a bypass function or a butterfly function.

18. The apparatus according to claim 17, wherein said processing means comprises another enhanced DFT module means as a combination of two different types of said at least one type of DFT module.

19. The apparatus according to claim 18, wherein said processing means comprises at least one of said enhanced DFT module and said other enhanced DFT module for obtaining a DFT with a desired vector size.

20. The apparatus according to claim 19, wherein said enhanced DFT module has a vector size of 12 samples and said other enhanced DFT module has a vector size of 24 samples.

21. The apparatus according to claim 19, wherein said desired vector size is a value other than $2^x$, x being an integer number.

22. The apparatus according to claim 21, wherein said desired vector size is selected from the values of 1152, 576, 288, 144, 48, and 24.

* * * * *